US012632580B2

(12) United States Patent
Tonry et al.

(10) Patent No.: US 12,632,580 B2
(45) Date of Patent: May 19, 2026

(54) MANAGING SANITIZATION OF DATA PROCESSING SYSTEMS USING OUT-OF-BAND METHODS

(71) Applicant: Dell Products L.P., Round Rock, TX (US)

(72) Inventors: Richard M. Tonry, Georgetown, TX (US); Abeye Teshome, Austin, TX (US); Bassem El-Azzami, Austin, TX (US); Mohit Arora, Frisco, TX (US); Vinodkumar Vasudev Ottar, Mckinney, TX (US); Luis Antonio Valencia Reyes, Waxahachie, TX (US); Adolfo Sandor Montero, Pflugerville, TX (US); Amy Christine Nelson, Round Rock, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 132 days.

(21) Appl. No.: 18/498,324

(22) Filed: Oct. 31, 2023

(65) Prior Publication Data

US 2025/0139271 A1     May 1, 2025

(51) Int. Cl.
*H04L 29/06* (2006.01)
*G06F 21/62* (2013.01)

(52) U.S. Cl.
CPC ................................. *G06F 21/6218* (2013.01)

(58) Field of Classification Search
CPC .................................................. G06F 21/6218
See application file for complete search history.

(56) References Cited

U.S. PATENT DOCUMENTS

| 7,599,907 B2 | 10/2009 | Havewala et al. |
| 8,020,192 B2 | 9/2011 | Wright et al. |
| 8,490,163 B1 | 7/2013 | Harsell et al. |
| 8,738,935 B1 * | 5/2014 | Brooker .............. G06F 21/6218 |
| | | 713/193 |
| 8,850,186 B2 | 9/2014 | Yamauchi |
| 9,165,931 B1 * | 10/2015 | Schmit .................. H10B 69/00 |
| 9,191,781 B2 | 11/2015 | Kumar |
| 9,246,678 B2 | 1/2016 | Nayshtut et al. |
| 9,349,009 B2 | 5/2016 | Rivera |
| 9,721,111 B2 | 8/2017 | Cavanaugh |

(Continued)

*Primary Examiner* — Jason K Gee
(74) *Attorney, Agent, or Firm* — WOMBLE BOND DICKINSON (US) LLP

(57) ABSTRACT

Methods and systems for managing a data processing system are disclosed. A management controller of the data processing system may provide a sanitization request to a policy management server using an out-of-band communication channel. The management controller may obtain a response to the sanitization request from the policy management server via the out-of-band communication channel. The response may indicate whether performance of a sanitization process is authorized. The authorization may be based on a sanitization policy that governs sanitizations for the data processing system. If performance of the sanitization process is authorized, then the management controller may initiate and/or perform an action set based on the sanitization policy in order to complete the sanitization process, thereby placing the data processing system in a safe state.

20 Claims, 7 Drawing Sheets

(56)          References Cited

U.S. PATENT DOCUMENTS

| | | | |
|---|---|---|---|
| 9,721,175 B2 | 8/2017 | Kursun et al. | |
| 9,785,491 B2 | 10/2017 | Cilfone et al. | |
| 10,021,669 B2 | 7/2018 | George | |
| 10,163,105 B1 | 12/2018 | Ziraknejad et al. | |
| 10,169,571 B1 | 1/2019 | Attfield et al. | |
| 10,395,039 B2 | 8/2019 | Khatri et al. | |
| 10,630,489 B2 | 4/2020 | Hughes | |
| 10,678,555 B2 | 6/2020 | Johansson et al. | |
| 10,841,295 B1 | 11/2020 | Pecen et al. | |
| 11,563,565 B2 | 1/2023 | Yang et al. | |
| 11,704,384 B2 | 7/2023 | Murphy et al. | |
| 2013/0227634 A1* | 8/2013 | Pal | H04L 63/0428 |
| | | | 726/1 |
| 2015/0271207 A1 | 9/2015 | Jaiswal | |
| 2017/0277876 A1 | 9/2017 | Alameh et al. | |
| 2017/0289197 A1 | 10/2017 | Mandyam et al. | |
| 2018/0006829 A1 | 1/2018 | Kravitz et al. | |
| 2018/0255080 A1 | 9/2018 | Paine | |
| 2018/0341773 A1* | 11/2018 | Khatri | G06F 21/602 |
| 2019/0156019 A1 | 5/2019 | Chen | |
| 2019/0207980 A1 | 7/2019 | Sarin | |
| 2019/0312887 A1 | 10/2019 | Grimm | |
| 2020/0195433 A1* | 6/2020 | Collier | G06F 21/602 |
| 2021/0099467 A1 | 4/2021 | March | |
| 2022/0222328 A1 | 7/2022 | Talib et al. | |

* cited by examiner

MANAGING SANITIZATION OF DATA PROCESSING SYSTEMS USING OUT-OF-BAND METHODS

FIELD

Embodiments disclosed herein relate generally to managing data processing systems. More particularly, embodiments disclosed herein relate to systems and methods for sanitizing data processing systems using out-of-band methods.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
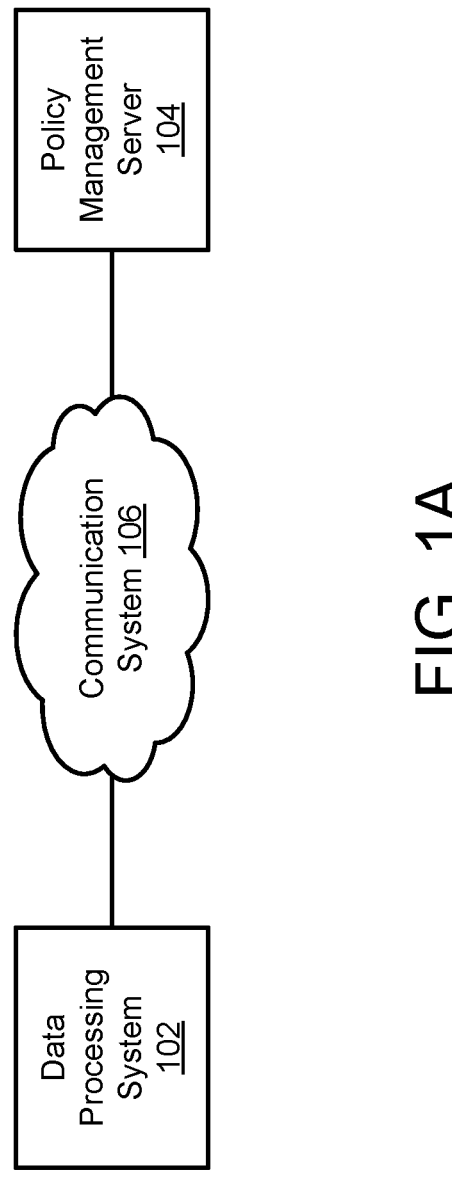
FIG. 1A shows a block diagram illustrating a distributed system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing a data processing system. The data processing system may provide computer-implemented services using data (e.g., sensitive data) stored by and/or accessible to the data processing system. The security of the sensitive data may depend on a security framework that may be implemented in order to protect the data from unauthorized management. For example, the security framework may include sanitization of the data processing system, which may be performed in situations where the sensitive data has a high likelihood of being compromised (e.g., accessed, modified, leaked, and/or otherwise managed by an unauthorized and/or malicious party).

A data processing system may be sanitized, for example, by performing a sanitization process. The sanitization process may be performed according to a sanitization policy for the data processing system. The sanitization policy may indicate actions that, when performed, may place the data processing system in a safe state (e.g., a state in which sensitive data stored by the data processing system is unlikely to be compromised).

However, initiation, performance, and/or successful completion of the sanitization process may rely on certain functionality of hardware resources (in-band components) of the data processing system. Therefore, if a portion of the functionality of the hardware resources is reduced (e.g., due to a failure of the hardware resources, the hardware resources becoming unpowered, etc.) and/or if the hardware resources become compromised (e.g., by a malicious party), then the data processing system may not be placed in the safe state. Consequently, the sensitive data may be more likely to become compromised.

Thus, to increase the security of sensitive data stored by and/or accessible to a data processing system, sanitization of the data processing system may be managed using out-of-band methods. For example, out-of-band components of the data processing system that operate independently from the in-band components may manage sanitization processes and sanitization policies for the data processing system. To manage the processes and policies, the out-of-band components may communicate with other devices (e.g., servers) via out-of-band communication channels in order to circumvent potentially compromised (e.g., unsecure) and/or inoperable in-band components and in-band communication channels.

By doing so, embodiments disclosed herein may provide a system for managing sanitization of a data processing system. To do so, the data processing system may include out-of-band components such as a management controller. The management controller may, for example, communicate with a policy management server through out-of-band communication channels to obtain sanitization policies and/or may perform actions based on the sanitization policies in order to place the data processing system in a safe state. Once placed in the safe state, the data processing system may be less likely to facilitate mismanagement (e.g., unauthorized management that may lead to exposure and/or destruction) of sensitive data.

In an embodiment, a computer-implemented method for managing a data processing system is provided. The method may include: providing, by a management controller of the data processing system and via an out-of-band communication channel, a sanitization request to a policy management server; and, obtaining, by the management controller and via the out-of-band communication channel, a response to the sanitization request from the policy management server, the response indicating whether performance of a sanitization process is authorized based, at least in part, on a sanitization policy that, at least in part, governs sanitizations for the data processing system.

In a first instance of the obtaining, where the performance of the sanitization process is authorized, the method may include performing, by, at least in part, the management controller, an action set based on the sanitization policy in order to complete the performance of the sanitization process to place the data processing system in a safe state.

The method may further include, prior to providing the sanitization request: obtaining, by the management controller, instructions to initiate the sanitization process from hardware resources of the data processing system.

The method may further include, prior to providing the sanitization request: obtaining, by the management controller and via the out-of-band communication channel, instructions to initiate the sanitization process from the policy management server.

In the first instance of the obtaining, where the performance of the sanitization process is authorized, the response may confirm, to the management controller, that the instructions have been authenticated by the policy management server.

Performing the action set may include deleting a portion of data stored on the data processing system. Performing the action set may further include providing a sanitization status to the policy management server.

After placing the data processing system in the safe state, sensitive data previously stored on the data processing system may be unrecoverable from the data processing system.

The sensitive data may include at least one type of sensitive data from a list of types of sensitive data consisting of: a fingerprint; a password; device-specific provisioning data; and owner-specific provisioning data.

The data processing system may include a network module adapted to separately advertise network endpoints for the management controller and hardware resources of the data processing system, the network endpoints being usable by the policy management server to address communications to the hardware resources and the management controller.

The out-of-band communication channel may run through the network module, and an in-band communication channel that services the hardware resources may also run through the network module.

The management controller and the network module may be on separate power domains from the hardware resources so that the management controller and the network module are operable while the hardware resources are inoperable.

The response may be obtained while the hardware resources are inoperable due to being unpowered. The sanitization process may be performed while at least a portion of the hardware resources are inoperable due to being unpowered.

A non-transitory media may include instructions that when executed by a processor cause the computer-implemented method to be performed.

The data processing system may include the non-transitory media and a processor, and may perform the computer-implemented method when the computer instructions are executed by the processor.

Turning to FIG. 1A, a block diagram illustrating a distributed system in accordance with an embodiment is shown. The system shown in FIG. 1A may provide for management of computing devices that may provide, at least in part, computer-implemented services. The computer-implemented services may include, for example, database services, data processing services, electronic communication services, and/or any other services that may be provided using one or more computing devices. Other types of computer-implemented services may be provided by the system shown in FIG. 1A without departing from embodiments disclosed herein.

The computer-implemented services may be provided by one or more components shown in the system of FIG. 1A. For example, the computer-implemented services may be provided, in part, by data processing system 102. Data processing system 102 may include any number of computing devices that may each include any number of hardware components (e.g., hardware resources such as processors, memory modules, storage devices, communications devices). The hardware components may support execution of any number and types of software components (e.g., applications), and, in some combination, these components may provide for various types of computer-implemented services.

To provide the computer-implemented services, data processing system 102 (e.g., hardware resources of data processing system 102) may store and/or access sensitive data. For example, sensitive data may include biometric data, user credentials, user data, trade secrets, and/or other types of sensitive data. To protect the sensitive data, a security framework may be implemented by data processing system 102 and/or other devices that may participate in the management of data processing system 102. The security framework may include security policies, such as a sanitization policy.

The sanitization policy may govern sanitizations for data processing system 102. For example, a sanitization policy for a data processing system (e.g., 102) may indicate that, before disposing of the data processing system, sensitive data stored by the data processing system is to be made unrecoverable (e.g., to be deleted) during a sanitization process. Once the sanitization process is complete (e.g., in accordance with the sanitization policy), the data processing system may be considered to be in a safe state for disposal (e.g., a safe disposition state).

However, compliance with the sanitization policy may rely on the secure functionality and/or availability of hardware resources of the data processing system (e.g., in-band components of the data processing system). For example, if a portion of the in-band components are inoperable (e.g., unpowered) and/or compromised (e.g., by a malicious party intending to mismanage the sensitive data), then the sanitization policy may be inaccessible and/or untrustworthy (e.g., not up to date, tampered with by the malicious party). As a result, the sanitization process may not be performed in accordance with an appropriate sanitization policy. For example, the sanitization process may not be performed, or the sanitization process may be performed without authorization, which may lead to sensitive data leaks, or undesired loss of sensitive data, respectively.

In general, embodiments disclosed herein may provide methods, systems, and/or devices for managing sanitization of a data processing system using out-of-band methods. To do so, the data processing system may include out-of-band components that may operate independently from the in-band components of the data processing system. The out-of-band components, along with other out-of-band devices, may manage the sanitization policies and processes for the data processing system, thereby removing any reliance on potentially compromised and/or unavailable in-band components. By doing so, the data processing system may be more likely to be in compliance with the sanitization policies, which may decrease the likelihood of the sensitive data becoming compromised or otherwise mismanaged.

To perform the above-mentioned functionality, the system of FIG. 1A may include data processing system 102, and/or policy management server 104. Data processing system 102, policy management server 104, and/or any other type of devices not shown in FIG. 1A may perform all, or a portion of the computer-implemented services independently and/or cooperatively. Each of these components is discussed below.

Data processing system 102 may include any number and/or type of data processing systems. Data processing system 102 may provide computer-implemented services according to its physical location. To do so, data processing system 102 may include out-of-band components, such as a management controller, and functionality that may allow the out-of-band components to communicate with other devices separately from in-band components and without traversing in-band communication channels of data processing system 102. For example, data processing system 102 may include functionality that allows the management controller to communicate with policy management server 104 via out-of-band communication channels. For more information regarding components of data processing system 102, refer to the discussion of FIG. 1B.

Out-of-band components of data processing system 102 may, for example (i) obtain sanitization requests for data processing system 102, (ii) provide sanitization requests to other devices (e.g., policy management server 104) via out-of-band communication channels, (iii) obtain responses to the sanitization requests, which may include sanitization policies for data processing system 102, (iii) perform actions based on the sanitization policies in order to complete sanitization processes for data processing system 102, (iv) provide a sanitization status of data processing system 102 to other devices (e.g., policy management server 104), and/or (v) perform other actions relating to policy enforcement.

The sanitization requests obtained by out-of-band components of data processing system 102 may be initiated via hardware resources (e.g., by a user with physical access to data processing system 102) and/or via other devices (e.g., by an administrator of data processing system 102). For more information regarding initiation of sanitization processes, refer to FIGS. 2A-2B.

Policy management server 104 may include any number and/or type of servers (e.g., devices) that may provide computer-implemented services, such as policy management services. To perform its functionality, policy management server 104 may communicate (e.g., exchange data) with out-of-band components of data processing system 102 via out-of-band communication channels (e.g., bypassing any in-band components of data processing system 102).

To provide policy management services, policy management server 104 may, for example, (i) obtain sanitization requests (e.g., from the out-of-band components and via out-of-band communication channels), (ii) identify sanitization policies for data processing system 102 based on the sanitization requests, (iii) authorize (or deny) sanitization requests (e.g., based on the sanitization policies and the authenticity of the sanitization requests), (iv) respond to the sanitization requests (e.g., by providing sanitization policies to the out-of-band components via the out-of-band communication channels), (v) obtain a sanitization status for data processing system 102 (e.g., from the out-of-band components), and/or (vi) perform other actions relating to policy management for data processing system 102 (e.g., log sanitization events, forward sanitization status to other devices, etc.). Refer to the discussion of FIG. 2A for more information regarding sanitization processes.

Thus, the sanitization of data processing system 102 may be managed using out-of-band methods (e.g., using out-of-band components and via out-of-band communication channels). By doing so, the appropriate sanitization policies may be more likely to be enforced in a timely manner, and sensitive data stored by data processing system 102 may be more likely to remain secure.

Figure 2A:
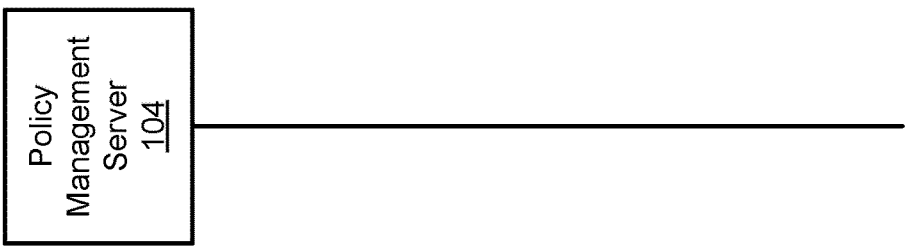
FIGS. 2A-2C show interaction diagrams in accordance with an embodiment.
Figure 2A:
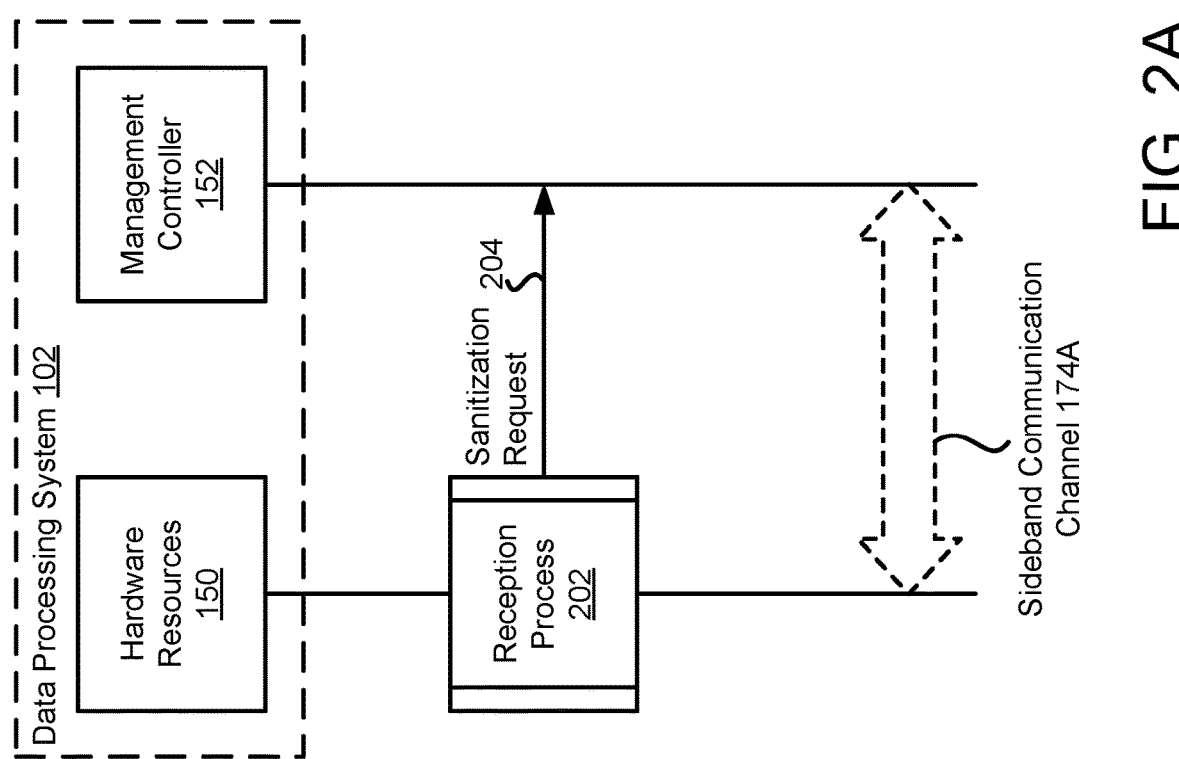
Figure 2B:
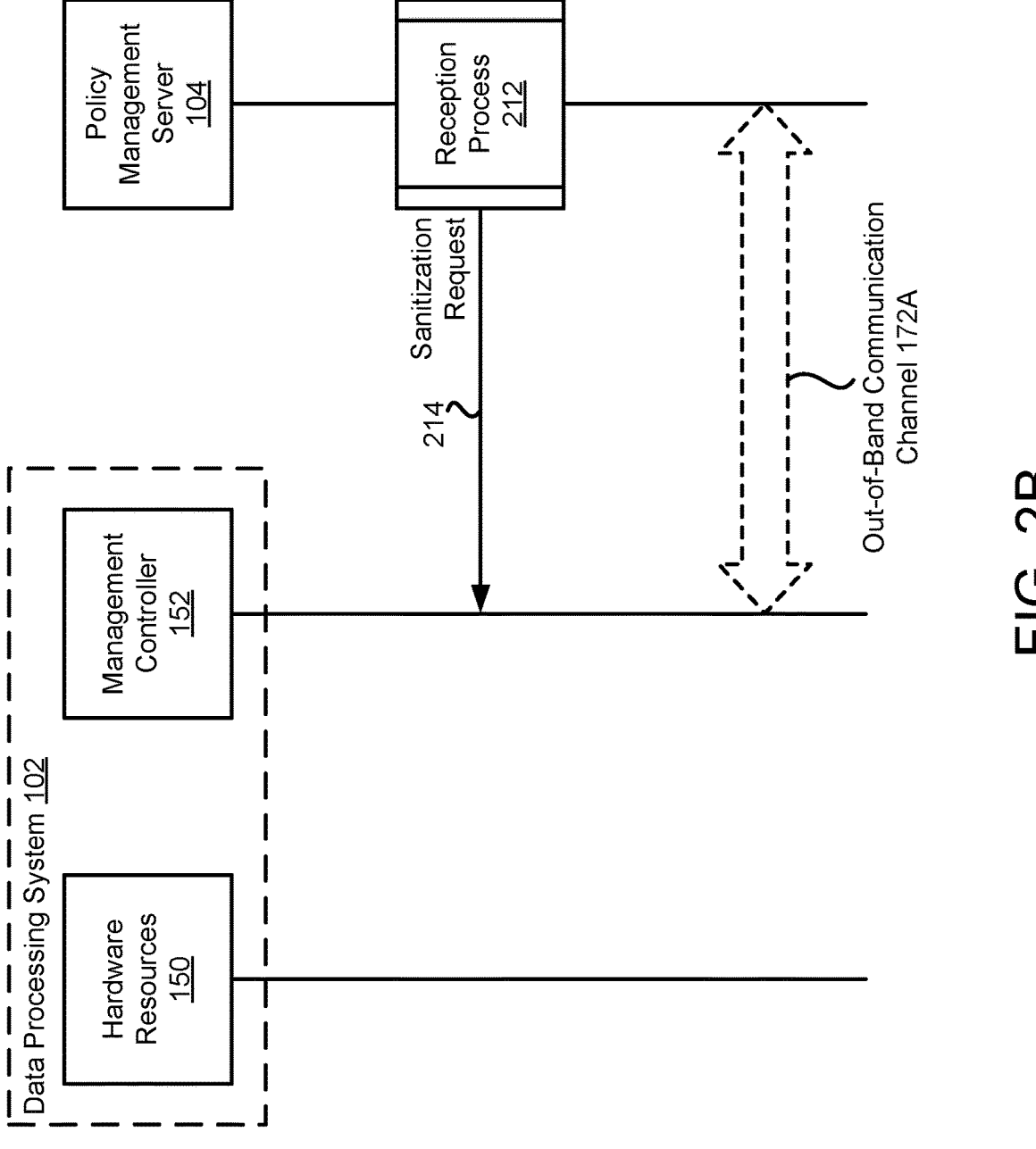
Figure 2C:
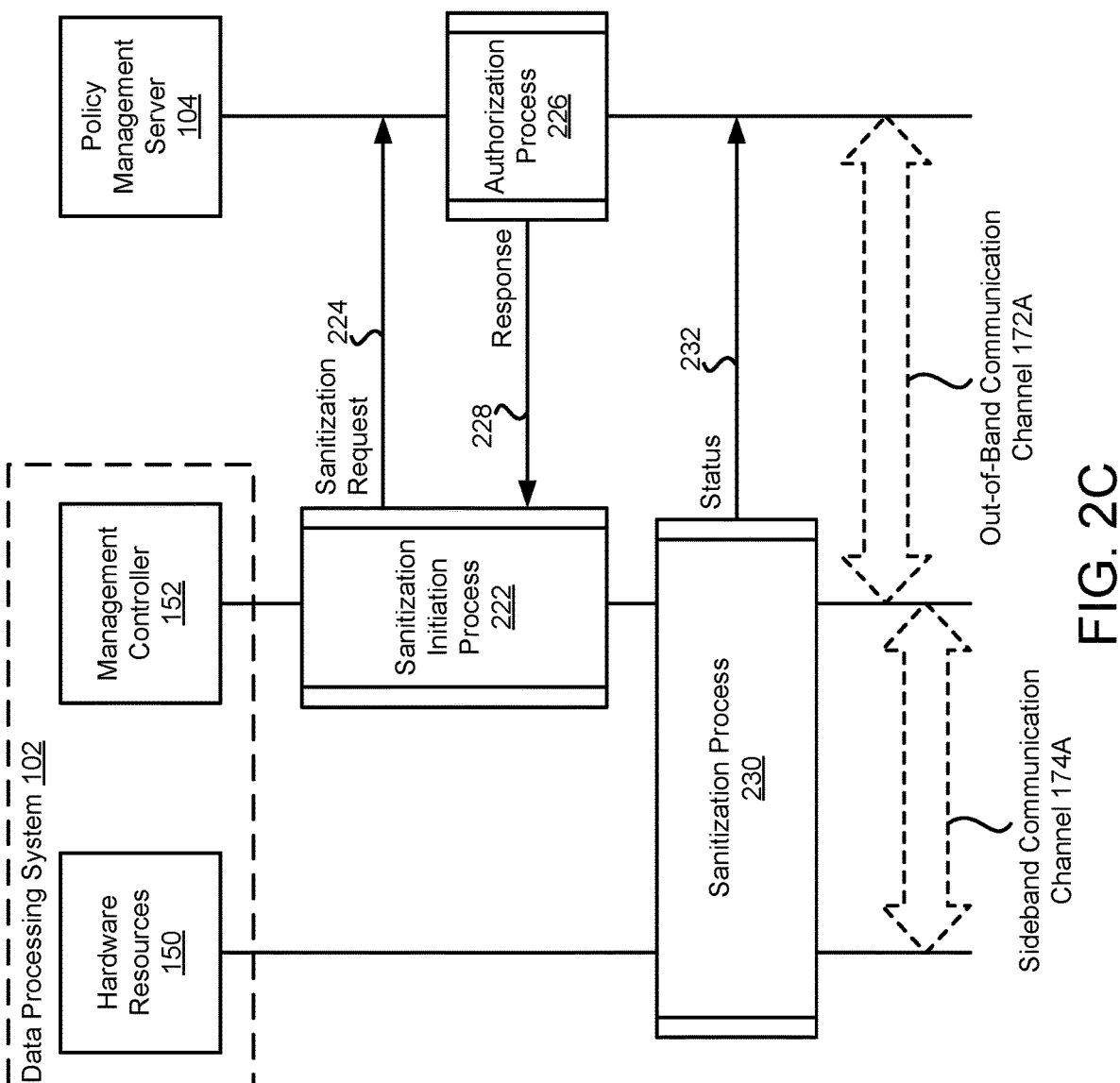
Figure 3:
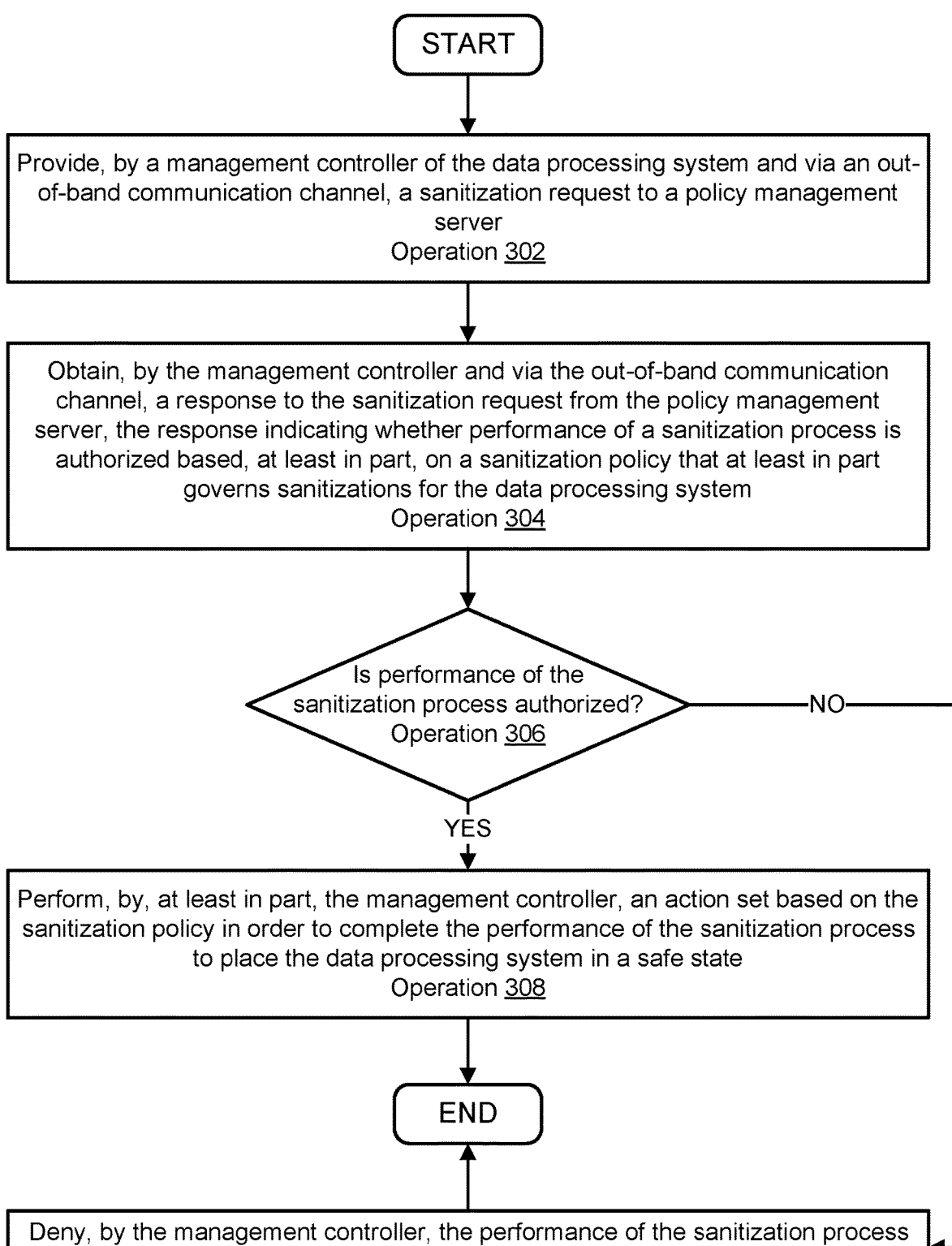
FIG. 3 shows a flow diagram illustrating a method in accordance with an embodiment.

When providing their functionality, any of data processing system 102 and/or policy management server 104 may perform all, or a portion of the processes, interactions, and/or methods shown in FIGS. 2A-3.

Any of (and/or components thereof) data processing system 102 and/or policy management server 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

In an embodiment, one or more of data processing system 102 and/or policy management server 104 are implemented using an internet of things (IoT) device, which may include a computing device. The IoT device may operate in accordance with a communication model and/or management model known to data processing system 102, policy management server 104, and/or other devices.

Any of the components illustrated in FIG. 1A may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). The networks may operate in accordance with any number and/or types of communication protocols (e.g., such as the internet protocol).

While illustrated in FIG. 1A as including a limited number of specific components, a system in accordance with an embodiment may include fewer, additional, and/or different components than those illustrated therein. For example, while the system of FIG. 1A shows a single data processing system (e.g., 102), it will be appreciated that the system may include any number of data processing systems.

Figure 1B:
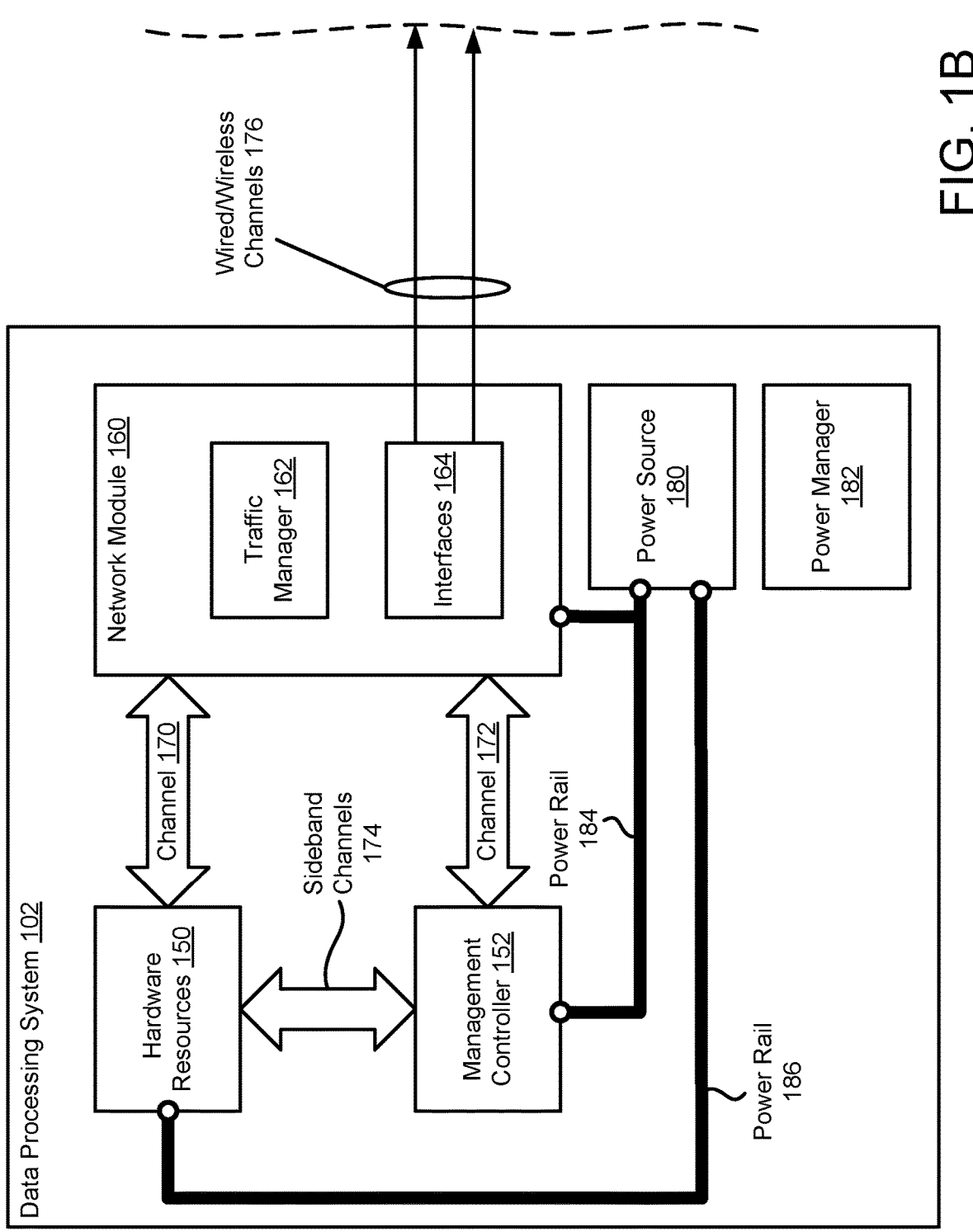
FIG. 1B shows a block diagram illustrating a data processing system in accordance with an embodiment.

Turning to FIG. 1B, a diagram illustrating a data processing system in accordance with an embodiment is shown. The data processing system (e.g., data processing system 102) shown in FIG. 1B may be similar to any of the computing devices (e.g., data processing system 102) shown in FIG. 1A.

To provide computer-implemented services, data processing system 102 may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, then these entities may subsequently compromise the operation of the applications. For example, if various drivers and/or the communication stack are compromised, then communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 102) to another device via any number of intermediate networks (e.g., via wired/wireless channels 176 that are part of the networks).

To reduce the likelihood of the applications and/or other in-band entities from being indirectly compromised, data processing system 102 may include management controller 152 and network module 160. Each of these components of data processing system 102 is discussed below.

Management controller 152 may be implemented, for example, using a system on a chip or other type of independently operating computing device (e.g., independent from the in-band components, such as hardware resources 150 of a host data processing system 102). Management controller 152 may provide various management functionalities for data processing system 102. For example, management controller 152 may monitor various ongoing processes performed by the in-band components, may manage power distribution, thermal management, and/or may perform other functions for managing data processing system 102 (e.g., enforce sanitization policies).

To do so, management controller 152 may be operably connected to various components via sideband channels 174 (in FIG. 1B, a limited number of sideband channels are included for illustrative purposes, it will be appreciated that management controller 152 may communicate with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152.

Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly, processes may be used to facilitate outbound communications from the applications.

Management controller 152 may be operably connected to communication components of data processing system 102 via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted components may not result in indirect compromise of any management controller 152, and entities hosted by management controller 152.

For example, if hardware resources 150 are compromised as part of an attack to access sensitive data stored by data processing system 102, then management controller 152 may perform a sanitization process surreptitiously and/or independently from hardware resources 150 (e.g., which may be under the control of an attacker). During the sanitization process, the sensitive data may be deleted thereby mitigating and/or preventing a negative outcome of the attack.

To facilitate communication with other devices, data processing system 102 may include network module 160. Network module 160 may provide communication services for in-band components and out-of-band components (e.g., management controller 152) of data processing system 102. To do so, network module 160 may include traffic manager 162, and interfaces 164.

Traffic manager 162 may include functionality to (i) discriminate traffic directed to various network endpoints advertised by data processing system 102, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

For example, a provisioning server (e.g., 104) may address a message to a network endpoint advertised by network module 160 for out-of-band communications. The message may include, for example, a response to a sanitization request (e.g., a sanitization policy for data processing system 102). Once the message is received by traffic manager 162, traffic manager 162 may forward the message to management controller 152 via an out-of-band communication channel (e.g., channel 172), differentiating the message from in-band communications to data processing system 102. Therefore, the sanitization policy may be obtained using out-of-band methods and may be less likely to be intercepted and/or modified (e.g., by the malicious party) than when using in-band methods.

To support inbound and outbound traffic, network module 160 may include any number of interfaces 164. Interfaces 164 may be implemented using any number and type of communication devices which may each provide wired and/or wireless communication functionality. For example, interfaces 164 may include a wireless wide area network (WWAN) card, a Wi-Fi card, a wireless local area network card, a wired local area network card, an optical communication card, and/or other types of communication components. These component may support any number of wired/wireless channels 176.

Thus, from the perspective of an external device, the in-band components and out-of-band components of data processing system 102 may appear to be two independent network entities that may be independently addressable and/or otherwise unrelated to one another.

To facilitate management of data processing system 102 over time, hardware resources 150, management controller 152 and/or network module 160 may be positioned in separately controllable power domains. By being positioned in these separate power domains, different subsets of these components may remain powered while other subsets are unpowered.

For example, management controller 152 and network module 160 may remain powered while hardware resources 150 is unpowered. Consequently, management controller 152 may remain able to communicate with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons. Therefore, if a portion of hardware resources 150 become unavailable (e.g., due to being unpowered) then out-of-band components may remain powered, allowing management controller 152 to obtain data (e.g., sanitization policies, authorizations for performing sanitization processes) through out-of-band communications via a network (e.g., from policy management server 104) and/or to perform processes (e.g., sanitization processes).

To implement the separate power domains, data processing system 102 may include a power source (e.g., 180) that separately supplies power to power rails (e.g., power rail 184, power rail 186) that power the respective power domains. Power from the power source (e.g., a power supply, battery, etc.) may be selectively provided to the separate power rails to selectively power the different power domains. A power manager (e.g., 182) that may manage power from power source 180 may be supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

To further clarify embodiments disclosed herein, an interaction diagram in accordance with an embodiment is shown in each of FIGS. 2A-2C. The interaction diagrams may illustrate examples of how data may be obtained and used within the systems of FIGS. 1A-1B.

In the interaction diagrams, processes performed by and interactions between components of a system in accordance with an embodiment are shown. In the diagrams, components of the system are illustrated using a first set of shapes (e.g., 150, 152, etc.), located towards the top of each figure. Lines descend from these shapes. Processes performed by the components of the system are illustrated using a second set of shapes (e.g., 202, 212 etc.) superimposed over these lines.

Interactions (e.g., communication, data transmissions, etc.) between the components of the system are illustrated using a third set of shapes (e.g., 204, 214, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 224 may occur prior to the interaction labeled as 228. However, it will be appreciated that the processes and interactions may be performed in different orders, any may be omitted, and other processes or interactions may be performed without departing from embodiments disclosed herein.

The processes shown in FIGS. 2A-2C may be performed by any entity shown in the systems of FIGS. 1A-1B (e.g., a device similar to one of data processing system 102, a server similar to policy management server 104, etc.) and/or another entity without departing from embodiments disclosed herein.

FIGS. 2A-2B show interaction diagrams that illustrate processes and interactions that may occur when initiating sanitization for a data processing system. As discussed with respect to FIGS. 1A-1B, data processing system 102 may include in-band components such as hardware resources 150, and out-of-band components such as management controller 152.

Turning to FIG. 2A, a first interaction diagram in accordance with an embodiment is shown. In the example presented in the first interaction diagram, the sanitization of data processing system 102 may be initiated via hardware resources 150. The initiation of the sanitization may lead to communication between management controller 152 and policy management server 104. Refer to FIG. 2C for more information regarding the participation of policy management server 104 in sanitization policy enforcement.

To initiate sanitization for data processing system 102, a user with physical access to data processing system 102 may generate instructions for sanitization (e.g., using software hosted by hardware resources 150). At least a portion of the instructions for sanitization may be executed by hardware resources 150 which may, for example, prompt hardware resources 150 to initiate reception process 202.

To perform reception process 202, hardware resources 150 may obtain identifying information for the user, a requesting device (e.g., hardware resources 150), and/or a target device for sanitization (e.g., data processing system 102). For example, the identifying information may be obtained by prompting the user for input (e.g., user credentials) and/or the identifying information may be included in the instructions for sanitization. The identifying information may include, for example, user and/or device credentials, and/or other information usable to authenticate the user and/or the devices. During reception process 202, hardware resources 150 may obtain (e.g., generate) a sanitization request.

The sanitization request may include, for example, (i) the identifying information (e.g., for users and/or devices), (ii) information regarding the requested sanitization (e.g., the instructions for sanitization, which may indicate components of the target device that are to be sanitized), and/or (iii) any other information usable to request the sanitization (e.g., a status of functionality of hardware resources of the target device, information usable to authenticate the sanitization request, etc.).

At interaction 204, the sanitization request may be provided to management controller 152 by hardware resources 150. For example, hardware resources 150 may provide the sanitization request to management controller 152 via sideband communication channel 174A through (i) transmission via a message, (ii) storing in a storage with subsequent retrieval by management controller 152, (iii) a publish-subscribe system where management controller 152 subscribes to updates from hardware resources 150 thereby causing a copy of the sanitization request to be propagated to management controller 152, and/or (iv) other processes. By providing the sanitization request to management controller 152, management controller 152 may provide services relating to sanitization policy enforcement. Refer to the discussion of FIG. 2C for more information regarding sanitization policy enforcement.

Thus, as shown in the example of FIG. 2A, sanitization of a data processing system may be initiated via hardware resources of the data processing system. Sanitization requests, although obtained using potentially compromised hardware resources of the data processing system, may be intercepted by a management controller of the data processing system so that the sanitization requests may be managed (e.g., authorized) out-of-band. By doing so, unauthorized sanitizations of the data processing system (e.g., initiated by malicious party with access to the hardware resources) may be more likely to be prevented.

Turning to FIG. 2B, a second interaction diagram in accordance with an embodiment is shown. In the example presented in the second interaction diagram, the sanitization of data processing system 102 may be initiated via policy management server 104.

The sanitization may be initiated by a user, or automatically by another device (e.g., upon receiving instructions to initiate the sanitization). For example, a user (e.g., an administrator of data processing system 102) may use an application hosted by a device (e.g., a requesting device) to generate instructions for sanitization for data processing system 102 (e.g., a target device). The device may include, for example, a user device, a service device, or any other device that may be used to manage data processing system 102. As discussed with respect to FIG. 2A, the instructions for sanitization may include identifying information for users and/or devices, information regarding the requested sanitization, etc.

For example, if hardware resources 150 are unavailable (e.g., inoperable, unpowered, and/or compromised), then sanitization of the data processing system may be initiated independently of hardware resources 150 via policy management server 104 (due to management controller 152 being powered and operating independently of hardware resources 150).

The instructions for sanitization may be obtained by policy management server 104 (e.g., via the application), prompting policy management server 104 to initiate reception process 212. During reception process 212, policy management server 104 may use identifying information (e.g., obtained from the requesting device and/or included in the instructions for sanitization) to identify out-of-band components of the target device.

For example, a device identifier for data processing system 102 may be associated with management controller 152 in a lookup database. Policy management server 104 may query the database to obtain information regarding management controller 152, which may include information usable to establish secure communication channels with and/or address messages to management controller 152.

Reception process 212 may include obtaining (e.g., generating) a sanitization request. The sanitization request may be similar to the sanitization request generated during reception process 202 of FIG. 2A.

At interaction 214, the sanitization request may be provided to management controller 152 by policy management server 104. For example, policy management server 104 may provide the sanitization request to management controller 152 via out-of-band communication channel 172A through (i) transmission via a message, (ii) storing in a storage with subsequent retrieval by management controller 152, (iii) a publish-subscribe system where management controller 152 subscribes to updates from policy management server 104 thereby causing a copy of the sanitization request to be propagated to management controller 152, and/or (iv) other processes. By providing the sanitization request to management controller 152, management controller 152 may provide services relating to sanitization policy enforcement. Refer to the discussion of FIG. 2C for more information regarding sanitization policy enforcement.

Thus, as shown in the example of FIG. 2B, sanitization for a data processing system may be initiated via other devices (e.g., a policy management server). Sanitization requests may be provided, via out-of-band communication channels, to a management controller of the data processing system for out-of-band management, avoiding potentially compromised and/or unavailable hardware resources of the data processing system.

Turning to FIG. 2C, a third interaction diagram in accordance with an embodiment is shown. The third interaction diagram may illustrate processes and interactions that may occur in order to sanitize a data processing system. The processes and interactions shown in FIG. 2C may occur after sanitization of data processing system 102 has been initiated. For example, sanitization may be initiated in-band, via hardware resources 150 of data processing system 102, and/or out-of-band, via policy management server 104. Refer to FIGS. 2A-2B for examples of initiating sanitization.

Once the sanitization of data processing system 102 is initiated (e.g., management controller 152 of data processing system 102 has obtained a sanitization request), management controller 152 may perform sanitization initiation process 222. Sanitization initiation process 222 may include authenticating, for example, the user and the requesting device, based on information (e.g., identifying information) included in the obtained sanitization request (e.g., via interactions 204, 214 of FIGS. 2A-2B).

If management controller 152 is unable to authenticate one or more of the user and/or the requesting device, then management controller 152 may deny the sanitization request and/or notify the requesting device of the denial (not shown). For example, management controller 152 may transmit a message to the requesting device (e.g., hardware resources 150 via sideband communication channel 174A, or policy management server 104 via out-of-band communication channel 172A).

However, if management controller 152 is able to authenticate both the user and the requesting device, then management controller 152 may modify the sanitization request. For example, management controller 152 may add information to the sanitization request (e.g., location data for data processing system 102) and/or management controller 152 may sign the sanitization request (e.g., using a private key of management controller 152) to indicate its authenticity. The sanitization request may be used to fetch a sanitization policy and authorization for sanitization from policy management server 104.

At interaction 224, the (modified) sanitization request may be provided to policy management server 104 by management controller 152. For example, management controller 152 may provide the sanitization request to policy management server 104 via out-of-band communication channel 172A through (i) transmission via a message, (ii) storing in a storage with subsequent retrieval by policy management server 104, (iii) a publish-subscribe system where policy management server 104 subscribes to updates from management controller 152 thereby causing a copy of the sanitization request to be propagated to policy management server 104, and/or (iv) other processes. By providing the sanitization request to policy management server 104, policy management server 104 may provide policy management services.

To provide the services, policy management server 104 may perform authorization process 226. The authorization process may be performed in order to authenticate the sanitization request (e.g., the instructions for authentication). Authorization process 226 may include device-specific authentication. For example, policy management server 104 may authenticate management controller 152 based on the sanitization request signed by management controller 152. If policy management server 104 is unable to authenticate management controller 152, then policy management server 104 may deny the sanitization request.

However, if policy management server 104 is able to authenticate management controller 152, then authorization process 226 may include performance of additional actions (e.g., checks, verifications, authentications) to determine whether to authorize the sanitization request. During authorization process 226, policy management server 104 may communicate with other devices to verify that the sanitization request is authentic and/or whether the sanitization of data processing system 102 is authorized (or denied).

For example, policy management server 104 may verify authenticity of the sanitization request using two-factor authentication (e.g., by communicating with the user via a registered user device). Or, for example, if the user does not have sufficient privileges (e.g., permissions) for the sanitization request to be authorized, then policy management server 104 may obtain authorization for the sanitization from an administrator or an automated entity (e.g., an orchestrator) with sufficient privileges.

Authorization process 226 may include identifying at least one policy (e.g., a sanitization policy) based on the sanitization request. Policy management server 104 may manage storage of and/or have access to a database managing the (remote) storage of policies for any number of devices, including data processing system 102.

For example, policy management server 104 may have been provisioned to include policies (e.g., sanitization policies) for data processing system 102 and/or policy management server 104 may receive updates to the policies (e.g., from some security management entity). Therefore, to identify a sanitization policy for data processing system 102, policy management server 104 may query the database using information included in the sanitization request (e.g., identifying information, location data, etc.), and the database may return a sanitization policy applicable to the sanitization request. For example, the database may include various sanitization policies for data processing system 102, and their applicability may be based on a location of data processing system 102, a permission level of the user, current functionality of hardware resources 150, etc.

Authorization process 226 may include obtaining (e.g., generating) a response to the sanitization request. The response may include a signed work order indicating actions that may be performed to sanitize data processing system 102 according to the sanitization policy. For example, the response may include (i) authorization for (or denial of, if policy management server 104 is unable to authenticate management controller 152) the sanitization request, (ii) a sanitization policy (e.g., instructions for performing actions based on sanitization policy), and/or (iii) other information that may relate to enforcement of the sanitization policy.

At interaction 228, the response may be provided to management controller 152 by policy management server 104. For example, policy management server 104 may provide the sanitization request to management controller 152 via out-of-band communication channel 172A through (i) transmission via a message, (ii) storing in a storage with subsequent retrieval by management controller 152, (iii) a publish-subscribe system where management controller 152 subscribes to updates from policy management server 104 thereby causing a copy of the response to be propagated to management controller 152, and/or (iv) other processes. By providing the response to management controller 152, management controller 152 may initiate a sanitization process for data processing system 102.

By providing the response to management controller 152 (via out-of-band communication channel 172A), the response may be obtained by data processing system 102 (e.g., management controller 152) even while hardware resources 150 are unpowered. In addition, if hardware resources 150 are compromised by a malicious party, then the response may still be obtained without risk of tampering or interception of the response by the malicious party.

Once management controller 152 obtains the response, management controller 152 may read the response in order to determine whether the sanitization request has been authorized (e.g., authenticated) by policy management server 104. For example, if the response indicates that the sanitization request is not authorized, then management controller 152 may not initiate sanitization process 230 and/or may instead perform additional actions (e.g., security checks and/or other actions to investigate a potential unauthorized attempt to sanitize data processing system 102). However, if the response indicates that the sanitization request is authorized, then management controller 152 may initiate sanitization process 230.

Sanitization process 230 may include enforcing the sanitization policy (e.g., obtained from policy management server 104). For example, to enforce the sanitization policy, management controller 152 may perform actions (e.g., instructions for which may be included in the response) to conform data processing system 102 to the sanitization policy. The actions may be performed directly by management controller 152 or in conjunction with a portion of hardware resources 150 (via communication through sideband communication channel 174A).

The actions may include, for example, (i) deleting a portion of data stored on the data processing system (e.g., deleting data stored in firmware, hardware, non-volatile memory, on the hard disk drive), (ii) backing up data (e.g., the portion of data before deletion), (iii) reducing functionality of hardware resources 150 (e.g., permanently or temporarily), (iv) any other action that may place data processing system 102 in a safe state (e.g., any action that, when performed, may conform hardware, software, and/or data components of data processing system 102 to the sanitization policy).

Sanitization process 230 may be performed while a portion of hardware resources 150 are unpowered. For example, if a malicious party in control of data processing system 102 has powered off hardware resources 150 in an attempt to prevent sanitization process 230 from being performed, then by virtue of management controller 152 being powered and operating independently of hardware resources 150, sanitization process 230 may still be performed by management controller 152. For example, if required (e.g., by actions defined by the sanitization policy), then management controller 152 may include functionality for powering a sub portion of the portion of hardware resources 150.

During sanitization process 230, management controller 152 may obtain (e.g., generate) a status for data processing system 102 (e.g., a sanitizations status). To generate the status, management controller 152 may snoop activity and/or processes of hardware resources 150 before, during, and/or after completion of sanitization process 230. The status may include, for example, information regarding the actions performed during sanitization process 230, the current state of data processing system 102 (e.g., whether data processing system 102 has been placed in a safe state) and/or other information regarding data processing system 102 (e.g., log data of data processing system 102 indicating the activity and/or the processes performed by hardware resources 150, location data, etc.).

Sanitization process 230 may be considered complete once data processing system is placed in a safe state (e.g., the operation of components of and/or data stored by data processing system conform with the sanitization policy). For example, while data processing system 102 is in the safe state, sensitive data previously stored on the data processing system may be unrecoverable from the data processing system.

At interaction 232, the status may be provided to policy management server 104 by management controller 152. For example, management controller 152 may provide the status to management controller 152 via out-of-band communication channel 172A through methods similar to those of interaction 224. By providing the status to policy management server 104, policy management server 104 may (continue to) provide policy management services.

Policy management server 104 may perform policy management services based on the status. For example, policy management server 104 may (i) log the sanitization event and its outcome (e.g., based on the status), (ii) notify other devices of the sanitization event and/or the status of data processing system 102, and/or (iii) perform other actions based on the status. For example, the status, when provided to a dashboard (e.g., that may be monitored by an administrator), where the status may be used to determine future actions relating to data processing system 102 (e.g., for disposal of data processing system 102).

Thus, as shown in the example of FIG. 2C, requests for sanitization of a data processing system may be managed (e.g., authorized, performed) out-of-band in order to improve the likelihood of enforcement of sanitization policies applicable to the data processing system. In addition, the sanitization policies may be managed and/or obtained out-of-band, increasing the likelihood of the sanitization policies being up to date and trustworthy (e.g., not tampered with by a malicious party). By doing so, an authorized sanitization of the data processing system may be more likely to place the data processing system in a safe state (e.g., to secure sensitive data) and unauthorized sanitization of the data processing system may be more likely to be prevented (e.g., to retain sensitive data).

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2C may perform various methods to manage (sanitization of) data processing systems out-of-band. By using out-of-band methods to manage policies, authorization for sanitization, and/or sanitization processes, sensitive data stored by the data processing systems may be more likely to be protected from inadvertent disclosure and/or loss.

Turning to FIG. 3, a flow diagram illustrating a method for managing a data processing system in accordance with an embodiment is shown. The method illustrated in FIG. 3 may be performed by the components of the system of FIGS. 1A-2C and/or may be performed by a data processing system and/or another device. In the diagram discussed below and shown in FIG. 3, any of the operations may be repeated, performed in different orders, and/or performed in parallel with or in a partially overlapping in time manner with other operations.

At operation 302, the management controller of the data processing system may provide a sanitization request to a policy management server via an out-of-band communication channel. The sanitization request may be provided to the policy management server using methods described with respect to FIG. 2C and/or by other methods. The sanitization request may include, in part, instructions to initiate a sanitization process for the data processing system.

Prior to providing the sanitization request, the instructions to initiate the sanitization may be obtained by the management controller from a requesting device. In a first example, the instructions may be obtained (via a sideband communication channel of the data processing system) from hardware resources of the data processing system. In a second example, the instructions may be obtained (via the out-of-band communication channel) from the policy management server (e.g., initiated by a user of another device).

The instructions to initiate the sanitization process may be obtained by the management controller by (i) receiving the instructions, (ii) reading the instructions from storage, and/or (iii) other methods. Refer to the discussion of FIGS. 2A-2B for more details regarding initiating sanitization for a data processing system.

At operation 304, the management controller may obtain a response to the sanitization request via the out-of-band communication channel from the policy management server. The response may be obtained by the management controller using methods described with respect to FIG. 2C and/or by other methods. For example, the response may be obtained by (i) receiving the response via the out-of-band communication channel, (ii) reading the response from storage (e.g., managed by the policy management server), and/or (iii) other methods.

The response may be based on information included in the sanitization request and may include, for example, (i) information indicating whether the sanitization process is authorized (e.g., by the policy management server and/or another entity), and/or (ii) a sanitization policy applicable to the data processing system. The sanitization policy may, at least in part, govern sanitizations for the data processing system. For example, the sanitization policy may indicate whether performance of a (requested) sanitization process should be authorized and/or the sanitization policy may define actions that may be performed in order to place the data processing system in a safe state.

At operation 306, it may be determined whether performance of the sanitization process is authorized. Determining whether the performance of the sanitization process is authorized may include (i) identifying that the response was obtained from the policy management server, (ii) reading and/or interpreting at least a portion of the response, and/or (iv) other actions. For example, the response may confirm to the management controller that the instructions have been authenticated by the policy management server, indicating that the performance of the sanitization process is authorized.

If the performance of the sanitization process is authorized, then the method may proceed to operation 308. If the performance of the sanitization process is not authorized (e.g., if the performance of the sanitization process is denied), then the method may proceed to operation 310.

At operation 310, the management controller may deny the performance of the sanitization process. The performance of the sanitization process may be denied by (i) providing a response to a device (e.g., the requesting device) indicating that the sanitization request has been denied, and/or (ii) performing other actions (e.g., securing the data processing system from unauthorized sanitizations). For example, the user of the requesting device may be notified (e.g., by transmitting a message to the requesting device indicating) that the sanitization request has been denied.

The method may end following operation 310.

Returning to operation 306, if the performance of the sanitization process is authorized, then the method may proceed to operation 308.

At operation 308, the management controller may perform an action set based on the sanitization policy in order to complete the performance of the sanitization process. The action set may include instruction, software, and/or other data usable for performing the sanitization process. The action set may be performed by (i) obtaining (e.g., generating) instructions based on the sanitization policy, and/or (ii) executing the instructions in order to place the data processing system in a safe state.

For example, performing the action set may include (i) deleting a portion of data stored on the data processing system, (ii) modifying (e.g., reducing) functionality of the hardware resources, and/or (iii) providing a sanitization status to the policy management server. Performing one or more actions of the action set (e.g., completing the performance of the action set) may place the data processing system in the safe state. After placing the data processing system in the safe state, sensitive data previously stored on (or accessible to) the data processing system may be unrecoverable from the data processing system (e.g., due to the data being removed, loss of functionality of the hardware resources, etc.). Refer to the discussion of FIG. 2C for more details regarding sanitization processes.

The method may end following operation 308.

As illustrated above, embodiments disclosed herein may provide systems and methods usable to manage (sanitization of) data processing system using out-of-band methods, without relying on in-band methods (which may be unreliable and/or unsecure). The operation of and/or data stored by the data processing systems may be managed according to sanitization policies that govern sanitizations automatically and/or in real-time. By managing the sanitizations and the sanitization policies out-of-band, the sanitization policies may be more likely to be enforced in a timely manner; therefore, the likelihood of sensitive data stored by the data processing systems becoming compromised (e.g., deleted and/or accessed without authorization) may be reduced. Accordingly, the disclosed process provides for both an embodiment in computing technology and an improved method for managing the security of data processing systems.

Figure 4:
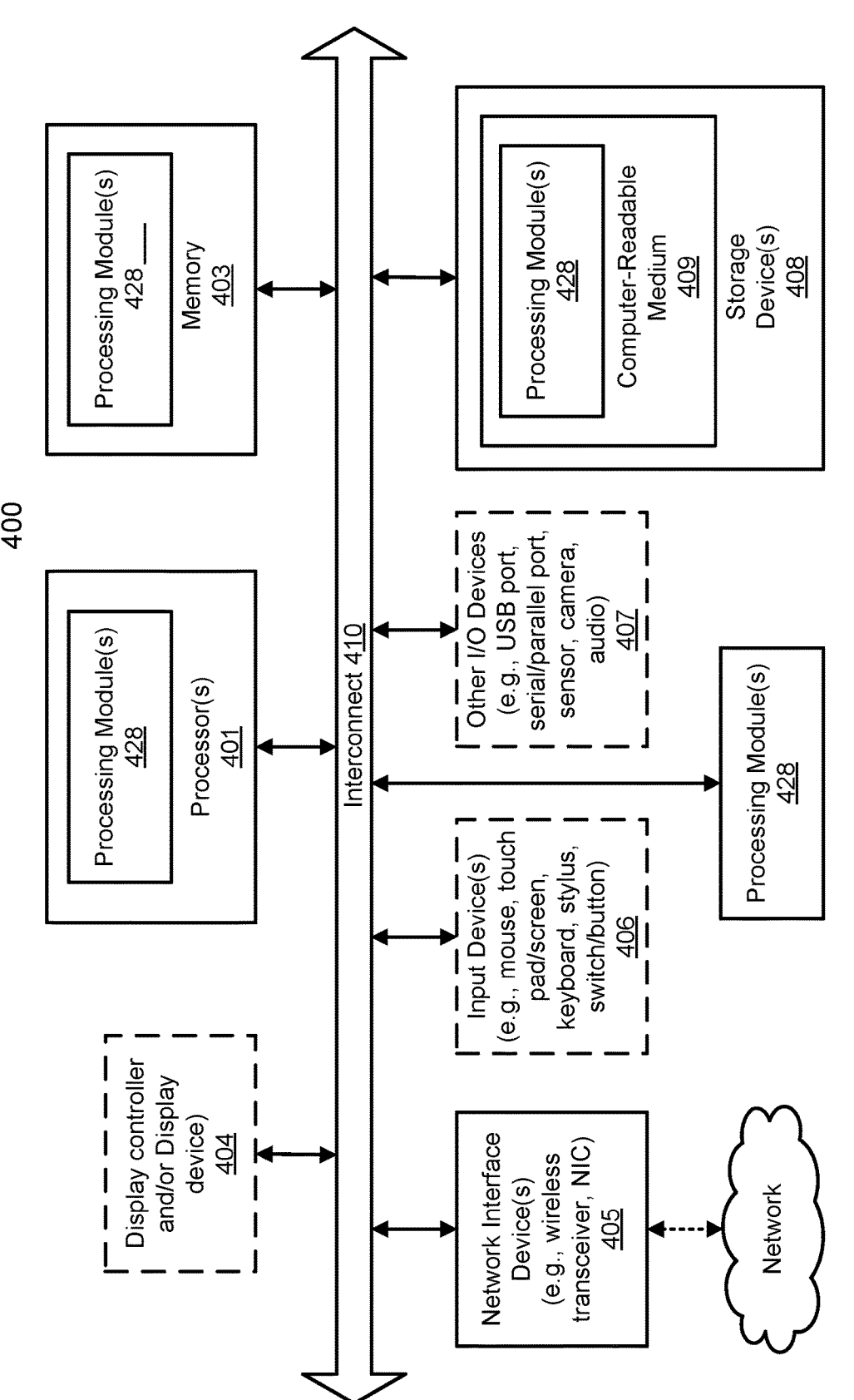
FIG. 4 shows a block diagram illustrating a data processing system in accordance with an embodiment.

Any of the components illustrated in FIGS. 1A-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations.

System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like.

More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets.

Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a data processing system, the method comprising:

providing, by a management controller of the data processing system and via an out-of-band communication channel that is provided by a network module of the data processing system that also provides in-band communication channels and the out-of-band communication channel also bypassing hardware resources of the data processing system that participate in performance of at least a portion of an action set, a sanitization request to a policy management server;

obtaining, by the management controller and via the out-of-band communication channel, a response to the sanitization request from the policy management server, the response indicating whether performance of a sanitization process is authorized based, at least in part, on a sanitization policy that, at least in part, governs sanitizations for the data processing system; and in a first instance of the obtaining, where the performance of the sanitization process is authorized:

performing, by, at least in part, the management controller, the action set based on the sanitization policy in order to complete the performance of the sanitization process to place the data processing system in a safe state.

2. The method of claim 1, further comprising:

prior to providing the sanitization request:

obtaining, by the management controller, instructions to initiate the sanitization process from the hardware resources of the data processing system.

3. The method of claim 1, further comprising:

prior to providing the sanitization request:

obtaining, by the management controller and via the out-of-band communication channel, instructions to initiate the sanitization process from the policy management server.

4. The method of claim 1, wherein performing the action set comprises deleting a portion of data stored on the data processing system.

5. The method of claim 4, wherein performing the action set further comprises providing a sanitization status to the policy management server.

6. The method of claim 1, wherein after placing the data processing system in the safe state, sensitive data previously stored on the data processing system is unrecoverable from the data processing system.

7. The method of claim 6, wherein the sensitive data comprises at least one type of sensitive data from a list of types of sensitive data consisting of:

a fingerprint;

a password;

device-specific provisioning data; and owner-specific provisioning data.

8. The method of claim 1, wherein the data processing system comprises a network module adapted to separately advertise network endpoints for the management controller and the hardware resources of the data processing system, the network endpoints being usable by the policy management server to address communications to the hardware resources and the management controller.

9. The method of claim 8, wherein the out-of-band communication channel runs through the network module, and an in-band communication channel that services the hardware resources also runs through the network module.

10. The method of claim 9, wherein the management controller and the network module are on separate power domains from the hardware resources so that the management controller and the network module are operable while the hardware resources are inoperable.

11. The method of claim 10, wherein the response is obtained while the hardware resources are inoperable due to being unpowered.

12. The method of claim 10, wherein the sanitization process is performed while at least a portion of the hardware resources are inoperable due to being unpowered.

13. The method of claim 1, wherein the hardware resources are adapted to provide desired computer implemented services using the in-band communication channels, the in-band communication channels bypassing the management controller, the in-band communication channels and the out-of-band communication channel facilitating separate addressing of the hardware resources and the management controller, and the in-band communication channels and the out-of-band communication channel being distinct physical layer channels.

14. The method of claim 1, wherein at least a portion of the hardware resources are unpowered when the response is obtained, and the at least the portion of the hardware resources are unpowered during performance of some of the action set.

15. A non-transitory machine-readable medium having instructions stored therein, which when executed by a processor, cause the processor to perform operations for managing a data processing system, the operations comprising:

providing, by a management controller of the data processing system and via an out-of-band communication channel that is provided by a network module of the data processing system that also provides in-band communication channels and the out-of-band communication channel also bypassing hardware resources of the data processing system that participate in performance of at least a portion of an action set, a sanitization request to a policy management server;

obtaining, by the management controller and via the out-of-band communication channel, a response to the sanitization request from the policy management server, the response indicating whether performance of a sanitization process is authorized based, at least in part, on a sanitization policy that, at least in part, governs sanitizations for the data processing system; and in a first instance of the obtaining, where the performance of the sanitization process is authorized:

performing, by, at least in part, the management controller, the action set based on the sanitization policy in order to complete the performance of the sanitization process to place the data processing system in a safe state.

16. The non-transitory machine-readable medium of claim 15, wherein the operations further comprise:

prior to providing the sanitization request:

obtaining, by the management controller, instructions to initiate the sanitization process from the hardware resources of the data processing system.

17. The non-transitory machine-readable medium of claim 15, wherein the operations further comprise:

prior to providing the sanitization request:

obtaining, by the management controller and via the out-of-band communication channel, instructions to initiate the sanitization process from the policy management server.

18. The non-transitory machine-readable medium of claim 17, wherein in the first instance of the obtaining, where the performance of the sanitization process is authorized, the response confirming, to the management controller, that the instructions have been authenticated by the policy management server.

19. A data processing system, comprising:

a processor; and a memory coupled to the processor to store instructions, which when executed by the processor, cause the processor to perform operations for managing the data processing system, the operations comprising:

providing, by a management controller of the data processing system and via an out-of-band communication channel that is provided by a network module of the data processing system that also provides in-band communication channels and the out-of-band communication channel also bypassing hardware resources of the data processing system that participate in performance of at least a portion of an action set, a sanitization request to a policy management server;

obtaining, by the management controller and via the out-of-band communication channel, a response to the sanitization request from the policy management server, the response indicating whether performance of a sanitization process is authorized based, at least in part, on a sanitization policy that, at least in part, governs sanitizations for the data processing system; and in a first instance of the obtaining, where the performance of the sanitization process is authorized:

performing, by, at least in part, the management controller, the action set based on the sanitization policy in order to complete the performance of the sanitization process to place the data processing system in a safe state.

20. The data processing system of claim 19, wherein the operations further comprise:

prior to providing the sanitization request:

obtaining, by the management controller, instructions to initiate the sanitization process from the hardware resources of the data processing system.

* * * * *